Nov. 27, 1934.  W. J. ANDRES  1,981,939
BRAKE
Filed June 20, 1927

INVENTOR
WILLIAM J. ANDRES
BY
M. W. McConkey
ATTORNEY

Patented Nov. 27, 1934

1,981,939

UNITED STATES PATENT OFFICE 1,981,939

BRAKE

William J. Andres, South Bend, Ind., assignor to Bendix Brake Company, South Bend, Ind., a corporation of Illinois Application June 20, 1927, Serial No. 199,969

30 Claims. (Cl. 188—78)

This invention relates to brakes and is illustrated as embodied in an internal expanding brake for an automobile. An object of the invention is to provide a brake of the type having shoes individually mounted on connected operating levers and with its parts arranged in such a manner as to give servo action in either direction of rotation of the brake drum. In order to achieve this result, the levers carrying the shoes are connected by a floating pivot or other connection, preferably provided with means restraining it from movement radially of the drum, the levers being moved in opposite directions to force the shoes against the drum by means such as a toggle connected to the unpivoted ends of the levers.

An important feature of the invention relates to the provision of novel anchoring means arranged to take the braking torque from one of the levers when the drum is turning in one direction and from the other lever when the drum is turning in the other direction, and which is illustrated as taking the form of two eccentric adjustable stops engaging projections extending radially inward from the two levers.

Many of the advantages of the above-described construction, as well as certain other advantages, may be secured with a generally-similar construction using a solid ring or the like in place of the connected levers, the shoes being mounted on opposite sides of the ring.

The above and other objects and features of the invention, including various novel and desirable details of construction, will be apparent from the following description of two illustrative embodiments shown in the accompanying drawing, in which.

Figure 1:
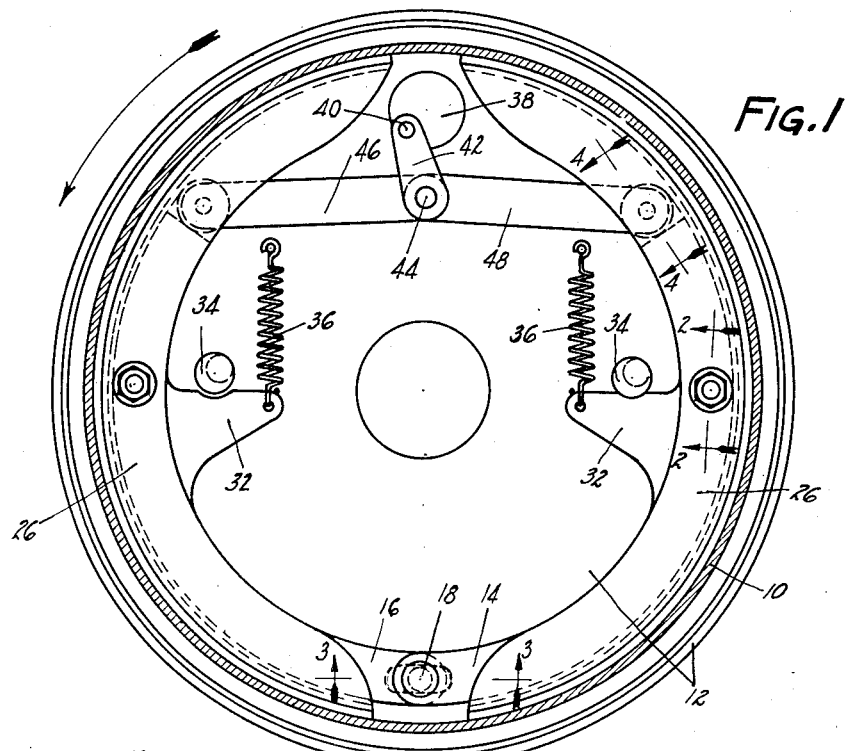
Figure 1 is a vertical section through the brake just inside the head of the brake drum and showing the brake shoes in side elevation.
Figure 3:
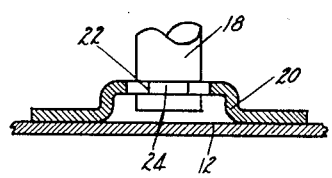
Figure 3 is a partial section on the line 3—3 of Figure 1 showing the means for restraining radial movement of the floating pivot connecting the two levers.

The brake illustrated in Figures 1-4 includes a drum 10 rotating with a wheel (not shown), at the open side of which drum is arranged a suitable backing plate 12. Within the drum are arranged two levers 14 and 16 connected at the lower side of the brake by a floating pivot 18 which I prefer to restrain against movement radially of the brake by means of a bracket 20 secured to the backing plate 12 and having an elongated slot 22 embracing a groove 24 in the end of the pivot 18, the slot 22 being arranged substantially along a chord of the drum 10. The width of the slot 22 may be such as to give any desired clearance with respect to pivot 18. If there is no clearance, the pivot will move along the chord in applying the brake. If the clearance is substantial, there will also be a radial component of movement.

Figure 2:
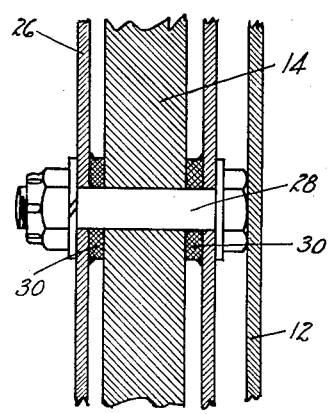
Figure 2 is a partial section on the line 2—2 of Figure 1 showing the mounting of one of the shoes on its levers.

On each of the levers 14 and 16 is arranged a channel-shaped brake shoe 26 which, as best shown in Figure 2, is preferably mounted on the lever by a pivot bolt 28 passing through the lever and through the side flanges of the brake shoe and clamping the side flanges lightly against friction washers 30 so that the shoe can shift angularly on the lever when it is forced against the brake drum but will normally retain its position.

Figure 4:
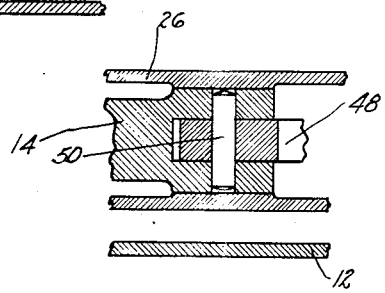
Figure 4 is a partial section on the line 4—4 of Figure 1 showing the means for connecting one of the toggle links to its lever.

In the form selected for illustration, the novel anchoring means includes a radial projection 32 on each of the levers 14 and 16, each projection having a rounded notch to engage an adjustable eccentric stop or anchor 34 against which the projection is urged by a tension spring 36 connected at its opposite ends to the backing plate 12 and to the end of the corresponding projection 32. Means for applying the brake is shown as including a shaft 38 having a crank pin 40 pivoted to one end of a link 42 which at its other end is pivoted to the knuckle pivot 44 connecting two toggle links 46 and 48. As shown in Figure 4, each of the toggle links is connected to its lever 14 or 16 by a pivot pin 50 which is held axially in place by the side flanges of the corresponding shoe 26.

In operation, if the drum is turning counter-clockwise, as in Figure 1, when the brake is applied the two levers are forced apart to force the two shoes 26 against the drum, whereupon the lever 16 with its shoe is urged by the drum in a counter-clockwise direction and the torque of both shoes is taken on the right-hand anchor 34. On the other hand, if the drum is turning in a clockwise direction the torque of both shoes is taken on the left-hand anchor 34. In either case the anchored shoe is acted upon with a very considerable servo action from the unanchored shoe.

Figure 5:
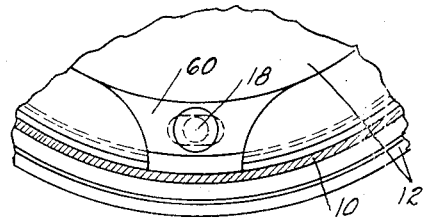
Figure 5 is a partial section corresponding to the lower part of Figure 1, but showing the use of a solid ring.

In Figure 5, in place of the connected levers there is a single rigid member such as a ring 60. When this construction is used, the ring 60 pivots about one or the other of the anchors 34 to bring both shoes against the drum with a considerable servo action, in the same general manner as with the connected levers.

While two illustrative embodiments have been described in detail, it is not my intention to limit the scope of the invention to those particular embodiments or otherwise than by the terms of the appended claims.

I claim:

1. A brake comprising, in combination, a drum, levers within the drum connected at one side of the drum by a floating joint, shoes pivotally mounted on the levers and forced by the levers against the drum in applying the brake, means for forcing the unconnected ends of the levers apart to apply the brake, and means for taking the braking torque of the shoes from one of said levers when the drum is turning in one direction and from the other of said levers when the drum is turning in the other direction.

2. A brake comprising, in combination, a drum, levers within the drum connected at one side of the drum by a constraining floating joint, separately formed shoes pivotally mounted on the levers and forced by the levers against the drum in applying the brake, means for forcing the unconnected ends of the levers apart to apply the brake, and a pair of anchors, one taking the braking torque of the shoes from one of said levers when the drum is turning in one direction and the other taking the torque from the other of said levers when the drum is turning in the other direction.

3. A brake comprising, in combination, a drum, levers within the drum pivotally carrying channel-shaped shoes engageable with the drum and shiftable with the shoes to anchor on one lever when the drum is turning in one direction and on the other lever when the drum is turning in the other direction, and means acting on the levers to force the shoes against the drum in applying the brake.

4. A brake comprising, in combination, a drum, levers within the drum carrying shoes engageable with the drum and shiftable with the shoes to anchor on one lever when the drum is turning in one direction and on the other lever when the drum is turning in the other direction, a floating joint connecting the levers said joint constrained to move in a predetermined path, and means acting on the levers to force the shoes against the drum in applying the brake.

5. A brake comprising, in combination, a drum, levers within the drum pivotally carrying shoes engageable with the drum and connected at their adjacent ends by a floating joint and formed with anchoring parts between their ends, said parts lying immediately adjacent the pivotal connection between the shoe and lever, a pair of anchors, one of which is engaged by one of said parts when the drum is turning in one direction and the other of which is engaged by the other of said parts when the drum is turning in the other direction, and means for forcing the levers in opposite directions to apply the brake.

6. A brake comprising, in combination, a drum, levers suspended within the drum and carrying shoes pivotally mounted thereon and engageable with the drum, said levers connected at their adjacent ends by a floating joint and formed with anchoring parts between their ends, a pair of anchors, one of which is engaged by one of said parts when the drum is turning in one direction and the other of which is engaged by the other of said parts when the drum is turning in the other direction, and means for forcing the levers in opposite directions to apply the brake, said anchoring parts being arms projecting inwardly from the levers and engageable with the anchors.

7. A brake comprising, in combination, a drum, levers within the drum carrying shoes engageable with the drum and connected at their adjacent ends by a floating joint and formed with anchoring parts between their ends, a pair of anchors, one of which is engaged by one of said parts when the drum is turning in one direction and the other of which is engaged by the other of said parts when the drum is turning in the other direction, and means for forcing the levers in opposite directions to apply the brake, said anchoring parts being arms projecting inwardly from the levers and engageable with the anchors, together with a pair of return springs urging the arms against the anchors and suspending said levers and shoes within said drum.

8. A brake comprising, in combination, a drum, levers connected at their adjacent ends by a floating joint and carrying shoes engageable with the drum, means for positioning the floating joint radially of the drum, and torque-taking means engaged by at least one of the levers, said means comprising a bracket slotted to receive a portion of the joint.

9. A brake including a curved lever pivoted at one end and having an inwardly-extending radial projection, a shoe pivoted on said lever, and an adjustable stop engaged by said projection.

10. A brake comprising, in combination, a drum, levers pivotally connected at adjacent ends by a floating joint, shoes pivotally mounted on the levers, and brake-applying means arranged at the unconnected ends of the levers.

11. A brake including a curved lever carrying a shoe formed with flanges on opposite sides of the lever, an operating link for the lever, and a pin pivotally connecting the lever and link and held against axial movement by said flanges.

12. A brake including a curved lever carrying a shoe formed with flanges on opposite sides of the lever, and a pivot pin for said lever held against axial movement by said flanges.

13. A brake including a floating rigid member having parts on diametrically opposite sides of the brake, in combination with shoes mounted respectively on said parts, and means to shift the rigid member bodily to apply the brake.

14. A brake comprising a rigid device having parts diametrically across the brake from each other and carrying a plurality of shoes and having a plurality of alternatively-effective anchorages.

15. A brake comprising a rigid floating ringlike device having pivoted thereon a plurality of shoes and having a plurality of alternatively-effective anchorages.

16. A brake comprising, in combination, a plurality of friction shoes, a rigid ringlike device operatively engaging said shoes, and means for shifting said device bodily crosswise of the drum to apply the brake.

17. A brake comprising, in combination, a plurality of friction shoes, a rigid device extending substantially more than 180° and operatively engaging said shoes, and means acting on the shoes through said device to apply the brake, together with alternatively-effective anchorages to which said device transmits the braking torque from said shoes.

18. A brake comprising, in combination, a drum, a floating assembly within the drum including a rigid device extending substantially more than 180° and a plurality of shoes carried thereby, and means to shift the rigid device for applying the brake.

19. A brake comprising, in combination, a drum, a floating assembly within the drum including a rigid device extending substantially more than 180° and a plurality of shoes pivotally mounted thereon, and means to shift the rigid device for applying the brake.

20. A brake comprising, in combination, a drum, a floating assembly within the drum including a bodily-movable device extending substantially more than 180° and a plurality of shoes carried thereby, the bodily movement of said device with the shoes being effective to apply the brake.

21. A brake comprising, in combination, a drum, a rigid floating device within the drum carrying a plurality of shoe mounted thereon at opposite sides of the drum and engageable with the drum, and means for shifting said device bodily to move the shoes into engagement with the drum.

22. A brake comprising, in combination, a drum, a rigid floating device extending substantially more than 180° within the drum carrying a plurality of shoes engageable with the drum, one anchorage for taking the torque of said shoes from said rigid device when the drum is turning in one direction, and a different anchorage for taking the torque of said shoes from said rigid device when the drum is turning in the opposite direction.

23. A brake comprising, in combination, a drum, a rigid floating device extending substantially more than 180° within the drum carrying a plurality of shoes engageable with the drum, one anchorage for taking the torque of said shoes when the drum is turning in one direction, and a different anchorage for taking the torque of said shoes when the drum is turning in the opposite direction.

24. A brake having a drum, and shoes on opposite sides of the drum, in combination with means for applying the shoes to the drum including a rigid device engaging the shoes on opposite sides of of the drum and shiftable crosswise of the drum to apply them.

25. In a wheel brake, a drum, a pair of anchors, a pair of oppositely disposed brake shoe supporting members mounted for servo action relative to said anchors and to each other, said brake shoe supporting members being pivotally connected to each other at their unanchored ends, tension means tending to maintain said brake shoe supporting members in released position, and brake shoes pivotally connected substantially at their central points to said brake shoe supporting members.

26. In a wheel brake, a drum, an anchor and a brake system arranged for servo action relative thereto including a brake supporting member adapted to transmit servo action to adjacent brake members, a brake shoe pivotally mounted on said brake member adjacent the center of said shoe whereby the latter may position itself relative to said drum independently of the position of said brake supporting member, and means for restraining excessive pivotal movement of said brake shoe relative to said brake supporting member, comprising a plurality of friction pads carried by one of said members and adapted to engage between the opposite faces of the other of said members.

27. A brake system comprising a rotatable drum and a floating shoe carrying device shifting to one or the other of two anchorage positions in opposite directions of drum rotation, and having friction shoes movably mounted thereon on opposite sides of the drum, in combination with friction means resisting movement of the shoes on said device.

28. A brake comprising a plurality of brake members having servo action one on the other, a brake shoe movably mounted on at least one of said members, and friction means resisting movement of said shoe on said member.

29. A brake device comprising an operating member and a brake shoe member, one of which is channel-shaped and has a pair of spaced portions straddling the other member, and friction means engaging said portions and said other member and resisting relative movement of the two members.

30. A brake comprising a drum, floating friction means, an anchor to resist braking torque in one direction, a second anchor to resist braking torque in the other direction, means exerting a force maintaining said friction means connected with both anchors until counteracted by frictional force of brake engagement.

WILLIAM J. ANDRES.